United States Patent
Haubs et al.

(10) Patent No.: US 6,350,852 B1
(45) Date of Patent: Feb. 26, 2002

(54) PROCESS FOR PRODUCING SULFUR-CONTAINING POLYMERS BY POLYMERIZING PREPOLYMERS AND MONOMERS

(75) Inventors: Michael Haubs, Bad Kreuznach; Reinhard Wagener, Flörsheim, both of (DE)

(73) Assignee: Ticona GmbH, Frankfurt am Main (DE)

( * ) Notice: Subject to any disclaimer, the term of this patent is extended or adjusted under 35 U.S.C. 154(b) by 0 days.

(21) Appl. No.: 09/202,255
(22) PCT Filed: Jun. 6, 1997
(86) PCT No.: PCT/EP97/02931
§ 371 Date: Feb. 10, 1999
§ 102(e) Date: Feb. 10, 1999
(87) PCT Pub. No.: WO97/47676
PCT Pub. Date: Dec. 18, 1997

(30) Foreign Application Priority Data

Jun. 14, 1996 (DE) .......................................... 196 23 706

(51) Int. Cl.⁷ .............................................. C08G 75/02
(52) U.S. Cl. ........................ 528/388; 528/381; 525/537
(58) Field of Search ................................ 528/388, 381, 528/364, 391; 525/537

(56) References Cited

U.S. PATENT DOCUMENTS 4,424,339 A * 1/1984 Idel .............................. 528/388
5,118,786 A * 6/1992 Ostlinning ................... 528/388

* cited by examiner

Primary Examiner—Donald R. Wilson
(74) Attorney, Agent, or Firm—Frommer Lawrence & Haug LLP

(57) ABSTRACT

The process for preparing sulfur-containing polymers, in particular polyarylene sulfides, from at least one sulfide and at least one aromatic dihalogen compound, in a solvent, is carried out in the steps: a) a mixture of aromatic dihalogen compound and sulfide is polymerized, b) aromatic dihalogen compound and sulfide are added to the polymerized mixture and c) the reaction mixture is polymerized further. The sulfur-containing polymers prepared by the process are distinguished by high purity and good mechanical properties.

9 Claims, No Drawings

PROCESS FOR PRODUCING SULFUR-CONTAINING POLYMERS BY POLYMERIZING PREPOLYMERS AND MONOMERS

CROSS REFERENCE TO RELATED APPLICATIONS

This application is filed pursuant to 35 U.S.C. §371 from PCT/EP97/02931, filed Jun. 6, 1997, which in turn claim priority to German application 196 23 706.8, filed Jun. 14, 1996.

STATEMENT REGARDING FEDERALLY SPONSORED RESEARCH OR DEVELOPMENT

Not Applicable.

BACKGROUND OF THE INVENTION

1. Field of the Invention

The invention relates to a process for preparing linear or branched sulfur-containing polymers, such as polyarylene sulfides, in particular polyphenylene sulfide (PPS), in which the monomers are added to a polymerized, or partially polymerized, mixture.

2. Description of the Related Art

U.S. Pat. No. 4,910,294 describes a process for preparing PPS. The monomers used are dihalogenated aromatic hydrocarbons, in particular dichlorobenzene (DCB), and sodium sulfide, which are reacted in a high-boiling dipolar aprotic solvent, such as N-methylpyrrolidone (NMP). Substantial amounts of solvent must be employed in order to bring the reaction partners to reaction, since the metal sulfide and the aromatic dihalogen compound reaction components are not miscible with one another. At least 3.5 mole of NMP per mole of sulfide are typically employed.

EP-A1-536684 describes the preparation of polyphenylene sulfide in NMP in concentrations higher than 3.5 mol of NMP per mole of sulfide, by adding p-dichlorobenzene to a dehydrated mixture of sodium sulfide and NMP and then polymerizing the mixture. However, a reaction temperature of 280° C. is required, and reproducibly high molecular weights, characterized by the melt viscosity of the products, are not achieved.

DE-A1-237 110 describes a process for preparing low-molecular-weight polyarylene sulfide by precharging an alkali metal sulfide in a high boiling polar N-alkyl-2-pyrrolidone and then metering in an aromatic dihalide. Here, the molar ratio of solvent to the sulfide employed reaches at least 3.1. The reaction time is in total 12 h after the start of dihalide addition, at at least 255° C.

EP-B1-215 259 describes a process for preparing polyarylene sulfides from dihaloaromatic compounds and alkali metal sulfide in N-methylcaprolactam in which half of the reaction mixture is precharged under gentle reflux. The second half of the mixture, that is including the solvent, is then metered in. The minimum ratio achieved of solvent to the sulfide employed is 3.25. The mean reaction time in the stirred vessel cascade is 12.5 h.

EP 0 374 462 describes the preparation of polyarylene sulfides by continuous addition of sulfide to a mixture of dihaloaromatic compound and polar solvent. The molar ratio of polar solvent to sulfide is from about 1.1 to 1.8:1. The reaction times are from about 10 to 15 hours.

If less solvent is employed in the processes of the prior art, molecular weight and polymer yield are poor; at higher solvent concentrations, the space-time yield is unsatisfactory. To achieve satisfactory space-time yields, the reaction temperature is frequently raised, but this leads to an increase in side-reactions.

The object is therefore to prepare sulfur-containing polymers, in particular polyarylene sulfides, over a wide molecular weight range of molar mass (e.g. Mw=10,000–200,000 g/mol), with good space-time yield, using the mildest possible reaction conditions, and with the least possible contamination by by-products.

BRIEF SUMMARY OF THE INVENTION

It has been found that it is possible to prepare sulfur-containing polymers, in particular polyarylene sulfides, with high space-time yield, with a total solvent requirement of less than 300 g of solvent per mole of sulfide employed, at reaction temperatures not higher than 250° C., and with short reaction times (less than 5 hours), if a prepolymer is firstly formed from aromatic dihalogen compound and sulfide in a polar solvent, and is then converted, by addition of aromatic dihalogen compound and sulfide, to a polymer of higher molecular weight.

DETAILED DESCRIPTION OF THE INVENTION

The invention therefore relates to a process for preparing sulfur-containing polymers from at least one aromatic dihalogen compound and at least one sulfide, in a solvent, where a) a mixture of aromatic dihalogen compound and sulfide is polymerized, b) aromatic dihalogen compound and sulfide are added to the polymerized mixture and c) the reaction mixture is polymerized further.

Sulfur-containing polymers are polymers which contain arylene sulfide units. The arylene constituents of the arylene sulfide units contain mono- or polynuclear aromatics or compound aromatics. The aromatic compounds may also contain heteroatoms. Examples of such aromatic compounds, which may be substituted or unsubstituted, are benzene, pyridine, biphenyl, naphthalene and phenanthrene. Examples of substituents are $C_1$–$C_6$–alkyl, $C_1$–$C_6$-alkoxy, carboxyl, amino and sulfonic acid groups. Examples of compound aromatics are biphenyl and aromatics bonded by ether bridges (arylene ethers).

Preferred sulfur-containing polymers are polyarylene sulfides, in particular polyphenylene sulfide.

Both inorganic and organic sulfides are suitable as sulfide for preparing the polymers. Inorganic sulfides are sulfides of alkali metals and alkaline earth metals, such as lithium sulfide, potassium sulfide, calcium sulfide, and preferably sodium sulfide. The corresponding bisulfides, or hydrogen sulfide, may also be employed, if desired together with alkali metal hydroxides. Suitable organic sulfides are salt-like sulfides with organic cations. For the purpose of the invention, organic sulfides are also those organic sulfur compounds which liberate sulfide anions or bisulfide anions under the conditions of the reaction, for example thioacetamide and thio-N-methylpyrrolidone. Sulfides may also be employed with water of crystallization.

Suitable aromatic dihalogen compounds are dihalogenated aromatic hydrocarbons, inter alia dihalobenzenes, such as o-, m- and p-dichlorobenzene, substituted dihalobenzenes, such as 2,5-dichlorotoluene, 3,5-dichlorobenzoic acid, 2,5-dichlorobenzenesulfonic acid and 3,5-dichlorobenzenesulfonic acid and their salts. Dihalonaphthalenes, such as 1,4-dibromonaphthalene and dihalodiphenyl ethers, such as 4,4'-dichlorodiphenyl ether, may, however, also be employed. Mixtures of different arylene dihalides may likewise be employed. Small amounts (from 0.2 to 5 mol percent based on dihaloaromatic compound) of polyhalogenated aromatic hydrocarbons may also be employed in order to obtain branched or crosslinked sulfur-containing polymers.

Dihaloaromatic compounds and sulfide are also referred to as monomers.

Suitable solvents for preparing the polymer are dipolar aprotic solvents of the amide type, such as dimethylformamide (DMF), dimethylacetamide (DMAc), N-methylcaprolactam and N-alkylated pyrrolidones, such as N-methylpyrrolidone (NMP), or mixtures thereof. NMP is particularly preferred.

The term prepolymers includes oligomers and polymers containing arylene sulfide units. These products usually have a molar mass, expressed as number average molar mass $M_n$, in the range from 500 to 20,000 g/mol. They may be linear or branched. It is also possible, by employing substituted dihaloaryl compounds (e.g. 2,5-dichlorotoluene) to prepare substituted prepolymers. Prepolymers with halogen end groups, in particular chlorine end groups, are preferably prepared.

The preparation of the prepolymer in step a) is generally carried out by reacting sulfide with dihalogen compounds in polar solvents, such as dimethyl sulfoxide, dimethylformamide (DMF), dimethyl acetamide (DMAc), N-alkylated lactams, such as N-alkylcaprolactams, e.g. N-methyl caprolactam (NMC), N-alkylpyrrolidones, e.g. N-methylpyrrolidone (NMP) or mixtures of these, under mild reaction conditions, i.e. at temperatures not above 250° C. The weight of solvent employed per mole of sulfide here is from 150 g to 1000 g, preferably from 250 g to 600 g. If NMP is employed as solvent, this is from 1.5 to 10 mol of NMP per mole of sulfide, preferably from 2.5 to 6 mol of NMP per mole of sulfide. From 0.9 to 1.5 mol of dihaloaromatic compound is employed per mole of sulfide. From 1.05 to 1.3 mol is particularly preferable, giving halogen-terminated prepolymers. The reaction temperatures are from 120 to 280° C., preferably from 190 to 250° C. The reaction times in step a) are from 0.1 to 5 h, preferably from 0.2 to 2 h. The conversion to prepolymers, based on sulfide, is from 10 to 98%, preferably from 30 to 95%, and particularly preferably from 50 to 80%.

The further addition of the monomers, in step b), to the prepolymerized mixture comprising solvent, prepolymer, the by-product salt and unconverted monomers, may be carried out in either batch or continuous manner. The aromatic dihalogen compound is pumped into the reactor as melt, or with a little solvent, by a metering pump. The sulfides may be added either in solid form through a valve or in liquid form as a melted hydrate, using a suitable pump. In a preferred embodiment of the invention, a homogeneous mixture of sulfide and solvent is added to the reaction mixture with prepolymer. The amount of solvent added with the monomers is adjusted so that there is a total of not more than 300 g of solvent per mole of sulfide in the reactor after the addition.

The ratio of the weight of the added monomers $m_1$ to the weight $m_2$ initially employed for preparing the prepolymer can vary within wide limits. The weight ratio of $m_1$ to $m_2$ can be from 0.1 to 10, preferably from 0.5 to 5, and particularly from 1 to 3.

In another preferred embodiment of the invention, the monomers are added in such a manner that a virtually stationary concentration of the monomers in the reaction mixture is maintained, i.e. the monomer concentration is held as constant as possible during the reaction. In such a stationary state, the amount of monomer added per unit of time is equal to the amount of monomer consumed in the reaction.

If the sulfide is added with water of crystallization, it is advantageous to remove water from the reaction mixture. This may be done in discrete steps or continuously. Besides water, dihaloaromatic compound, solvent, and some $H_2S$ are also removed. It has proven advantageous to remove water from this mixture and to return the remaining components to the reactor.

After the addition of the monomers is complete, the reaction mixture is polymerized to completion with stirring (step c). The reaction conditions can be varied within wide limits. The reaction temperatures may be from 120 to 280° C., preferably from 190 to 250° C. The reaction times may be from 20 minutes to 20 hours, preferably from 1 to 3 hours. In a preferred embodiment of the invention, the total reaction time is not more than 5 hours, at reaction temperatures not higher than 250° C.

All the phases of the preparation of the polymer may be carried out either batch-wise or continuously. The reaction may, for example, be using a stirred vessel cascade or in a tubular reactor or using a combination of both of these.

During the reaction, chemically bonded water of crystallization is usually liberated. It can be advantageous for the work-up to remove some or all of the water which is in the reaction mixture, after the reaction is complete. If desired, acids may be added prior to work-up, to neutralize or slightly acidify the reactor contents. Suitable acids are, for example, acetic acid, hydrochloric acid or carbon dioxide.

The polymer is separated off by simple pressure filtration. Other methods for separating solids from liquids may, however, also be employed, for example centrifuging or decanting. It is also possible to work up the resultant suspension by flash evaporation or spray drying, drawing off solvents and other low-molecular-weight substances as the main constituents in vapor form and giving the polymer and the by-product salt as substantially dry solids mixture.

In the case of pressure filtration, the filter residue is expediently washed with solvent in order to remove residues of mother liquor which adhere to it. This separation gives polymer and salt as a solid, and the mother liquor, which may be reused directly for preparing further polymer. The polymer may be separated from the solid, which may also first be dried, by boiling in water and subsequent filtration.

In a version of the work-up, the hot (from 150 to 240° C.) reaction mixture is filtered under pressure, giving only the salt as residue, the polymer being redissolved in the filtrate, from which the polymer may be isolated either by spray drying or by crystallization followed by filtration.

The molecular weights of the polyarylene sulfides may be adjusted to desired values via the stoichiometry of the sulfide and dihaloaromatic compound monomers. The maximum molecular weight is generally achieved when the dihaloaromatic compound is employed in a 2 mol % excess, based on sulfide.

The novel process is described below using the example of the preparation of polyphenylene sulfide (PPS), but without being restricted to this.

Sodium sulfide trihydrate is firstly dissolved by heating in NMP at 180° C. in a titanium autoclave. Some of the water of crystallization is then distilled off, until an internal temperature of 190° C. has been reached. The contents of the autoclave are heated further, and at a temperature of from 215 to 220° C. p-dichlorobenzene (DCB) is metered in. The prepolymer is then formed in a reaction time of from 30 min to 1 h at 230° C. After this first reaction phase, both reaction partners are metered in, continuously or little by little, over a period of about 1 h. The molar ratio of the components (sulfide:DCB:NMP) after completed addition is typically 1:1.05:2.8. During the reaction, the internal pressure of the reactor increases, since chemically bonded water is liberated. It has proven advantageous to control the water content of the reaction mixture. One way of achieving this is to limit the internal pressure of the reactor to values between 2 and 6 bar. This may be achieved by partially releasing the gas phase of the reactor into a condenser. After completed addition, stirring of the reaction mixture continues for from 1 to 2 hours at from 230 to 235° C. The reaction mixture is cooled and filtered, if desired, after dilution with solvent. The filter residue of PPS and sodium chloride is boiled several times with water, filtered, and then dried.

The melting points of the polyphenylene sulfides are from 270 to 305° C., typically from 280 to 295° C. The melt viscosity is in the range from 5000 to 500,000 mPas (centiPoise), preferably from 50,000 to 250,000 mPas (centiPoise). The melt viscosity is stable without additives: at 300° C., it changes by less than 10% over a period of 1 hour.

The sulfur-containing polymers, such as polyarylene sulfides, in particular polyphenylene sulfide, prepared by the novel process are distinguished by high purity and high quality. A particularly noteworthy property is that the polymers have virtually no odor and no discoloration. The polymers also show good characteristics when subjected to thermal stress.

The invention thus also relates to sulfur-containing polymers, such as polyarylene sulfides, prepared by the novel process. The sulfur-containing polymers prepared according to the invention may be converted into shaped articles by melt extrusion. Films and fibers with good mechanical properties may, however, also be produced.

The novel process has a number of advantages:

The amount of solvent employed is at most 300 g of solvent per mole of sulfide employed, so that a good space-time yield is achieved.

The overall reaction time is less than 5 hours.

The reaction temperature is not above 250° C. and may even be substantially lower, suppressing side reactions which are among the causes of toxic impurities in the polymer.

In the overall reaction, the polymer is obtained in a yield of at least 90%, typically 95%, based on the amount of sulfide employed.

The following examples illustrate the invention:

EXAMPLE 1

284 g of sodium sulfide trihydrate (about 60%; 2.2 mol) are dissolved in 780 g of NMP at 180° C. in a 2 l titanium autoclave. About 130 ml of condensate are then distilled off. The autoclave is heated to 230° C., and, starting at 215° C., 418 g of DCB (1.3×2.2 mol) dissolved in 220 g of warm NMP are added at a rate of 20 ml/min. Prepolymerization then takes place for 1 h at 230° C. and the autoclave is brought to atmospheric pressure. During this phase of prepolymerization, the molar ratio of NMP to sulfide is 4.6. 250 g of sodium sulfide trihydrate (60%; 2 mol) are then added to the still hot contents of the autoclave, and a mixture of water, DCB and NMP is distilled off until the internal temperature has reached about 190° C. The mixture is then heated to 230° C., and a further 360 g of DCB in 180 ml of NMP are metered in at a rate of 20 ml/min. Finally, the mixture is polymerized to completion for 1.5 h at 230° C., the molar ratio NMP:sulfide now being 2.85. The mixture is diluted with about 300 ml of NMP, and cooled. The crystalline reaction mixture is filtered, and the residue is boiled in water a number of times, filtered off and dried. Yield of PPS: 410 g (95% of theory). The mean molar mass of the polymer is $M_w$=20,000 g/mol.

EXAMPLE 2

230 g of sodium sulfide trihydrate (about 60%; 1.8 mol) are dissolved, with stirring, in 700 g of NMP at 180° C. in a 2 l titanium autoclave. About 95 ml of condensate are then distilled off. The autoclave is heated to 230° C., and, starting at 215° C., 418 g of DCB (1.3×2.2 mol) dissolved in 135 g of warm NMP are added at a rate of 20 ml/min. The autoclave contents are then held for 1 h at 230° C. During this phase of prepolymerization, the molar ratio of NMP to sulfide is 4.6. The autoclave is brought to atmospheric pressure and 192 g of sodium sulfide trihydrate (60%; 1.5 mol) are then added to the still hot contents of the autoclave, and a mixture of water, DCB and NMP is distilled off until the internal temperature has reached about 190° C. The mixture is then heated to 230° C., and a further 227 g of DCB in 102 ml of NMP are added at a rate of 20 ml/min. Finally, the mixture is polymerized to completion for 2.5 h at 230° C., the molar ratio NMP:sulfide now being 2.85. The mixture is diluted with about 300 ml of NMP, and cooled. The crystalline reaction mixture is filtered, and the residue is boiled in water a number of times, filtered off and dried. Yield of PPS: 334 g (95% of theory). The melt viscosity at 310° C. and at a shear rate of 1000 min$^{-1}$ is 12 Pas, corresponding to a mean molar mass of $M_w$=20,000 g/mol.

Comparative Example.

The following example shows that if the reaction is not carried out according to the invention low-molecular-weight polymers are produced in poor yield.

420 g of sodium sulfide trihydrate (about 60%; 3.2 mol) are dissolved in 780 g of NMP at 180° C. in a 2 l titanium autoclave. About 170 ml of condensate are then distilled off. The autoclave is heated to 230° C., and, starting at 215° C., 610 g of DCB (1.3×3.2 mol) dissolved in 320 g of warm NMP are added at a rate of 20 ml/min. Prepolymerization then takes place for 2 h at 230° C. and the autoclave is brought to atmospheric pressure, the contents are diluted with about 300 ml of NMP, and cooled. The crystalline reaction mixture is filtered, and the residue is boiled in water a number of times, filtered off and dried. Yield of PPS: 290 g (85% of theory). The mean molar mass of the polymer is $M_w$.7000 g/mol.

What is claimed is:

1. A process for preparing sulfur-containing polymers from at least one sulfide and at least one aromatic dihalogen compound in a solvent, which comprises:

a) polymerizing a mixture of aromatic dihalogen compound and sulfide;

b) adding aromatic dihalogen compound and sulfide to the polymerized mixture; and c) further polymerizing the reaction mixture wherein the molar ratio of solvent to the sulfide employed does not exceed 3 at the end of the reaction.

2. The process as claimed in claim 1, wherein the conversion based on sulfide in step a) is from 10% to 98% before adding the aromatic dihalogen compound and sulfide in step b) to the polymerized mixture.

3. The process as claimed in claim 1, wherein the conversion based on sulfide in step a) is from 30% to 95% before adding the aromatic dihalogen compound and sulfide to the polymerized mixture.

4. The process as claimed in claim 1, wherein the conversion based on sulfide in step a) is from 50% to 80% before adding the aromatic dihalogen compound and sulfide to the polymerized mixture.

5. The process as claimed in claim 1, wherein the aromatic dihalogen compound and sulfide are added continuously to the polymerized mixture obtained in step a).

6. The process as claimed in claim 1, wherein the amount of aromatic dihalogen compound and sulfide added in step b) is 0.1 to 10 times the amount of aromatic dihalogen compound and sulfide used in step a).

7. The process as claimed in claim 1, where the solvent used in N-methylpyrrolidone.

8. The process as claimed in claim 1, wherein the reaction temperature in the steps a), b) and c) does not exceed 250° C.

9. The process as claimed in claim 1, wherein the sum of reaction times of steps a), b) and c) does not exceed 5 hours.

* * * * *